United States Patent
Albertson et al.

(10) Patent No.: US 10,957,355 B2
(45) Date of Patent: Mar. 23, 2021

(54) AUTHENTICATING DIGITAL RECORDINGS

(71) Applicant: International Business Machines Corporation, Armonk, NY (US)

(72) Inventors: Chad M. Albertson, Rochester, MN (US); Mark S. Fredrickson, Rochester, MN (US); David G. Wheeler, Rochester, MN (US); Scott D. Frei, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 184 days.

(21) Appl. No.: 15/908,358

(22) Filed: Feb. 28, 2018

(65) Prior Publication Data
US 2019/0267036 A1   Aug. 29, 2019

(51) Int. Cl.
| H04L 9/00 | (2006.01) |
| G11B 20/00 | (2006.01) |
| H04L 9/08 | (2006.01) |
| H04L 9/32 | (2006.01) |

(52) U.S. Cl.
CPC ...... *G11B 20/00289* (2013.01); *H04L 9/0863* (2013.01); *H04L 9/0869* (2013.01); *H04L 9/0872* (2013.01); *H04L 9/3226* (2013.01); *H04L 9/3228* (2013.01); *H04L 9/3297* (2013.01)

(58) Field of Classification Search
CPC . H04L 9/3247; H04L 63/08; H04L 2209/608; H04L 63/0823; H04L 9/0643; H04L 9/3273; H04L 63/083
See application file for complete search history.

(56) References Cited

U.S. PATENT DOCUMENTS

| 6,611,607 B1 | 8/2003 | Davis et al. |
| 7,236,596 B2 | 6/2007 | Prokoski |
| 7,420,596 B2 | 9/2008 | Niimura |
| 7,617,542 B2 | 11/2009 | Vataja |
| 8,261,056 B2 | 9/2012 | Tagawa et al. |

(Continued)

FOREIGN PATENT DOCUMENTS

| CN | 101399669 A | 4/2009 |
| EP | 2146030 A1 | 1/2010 |

OTHER PUBLICATIONS

Garg et al. "Modeling and analysis of electric network frequency signal for timestamp verification." Information Forensics and Security (WIFS), 2012 IEEE International Workshop on. IEEE, 2012.

(Continued)

*Primary Examiner* — Ghazal B Shehni
(74) *Attorney, Agent, or Firm* — Patterson + Sheridan, LLP (57) ABSTRACT

Performing an operation comprising extracting a first element of encrypted data embedded in a digital recording comprising at least one of audio data and image data captured in a recording environment, generating a first decrypted value, the generating performed by execution of a cryptography algorithm based on a private key and the first element of encrypted data, comparing the first decrypted value and a stored value associated with a first element of the digital recording, and authenticating the digital recording based on the first decrypted value substantially matching the stored value.

20 Claims, 6 Drawing Sheets

(56) References Cited

U.S. PATENT DOCUMENTS

| | | | |
|---|---|---|---|
| 2002/0068987 A1* | 6/2002 | Hars | G11B 19/04 |
| | | | 700/94 |
| 2003/0126432 A1 | 7/2003 | Tonisson | |
| 2004/0034779 A1 | 2/2004 | Wood et al. | |
| 2004/0039929 A1 | 2/2004 | Decime | |
| 2004/0201751 A1 | 10/2004 | Bell et al. | |
| 2009/0193258 A1 | 7/2009 | Newman | |
| 2013/0318351 A1* | 11/2013 | Hirano | H04L 9/3073 |
| | | | 713/168 |

OTHER PUBLICATIONS

Rodriguez et al., "Audio authenticity: Detecting ENF discontinuity with high precision phase analysis." IEEE Transactions on Information Forensics and Security 5.3 (2010).

Yuan, Digital Watermarking-Based Authentication Techniques for Real-Time Multimedia Communication. Diss. Technische Universität, 2006.

International Search Report and Written Opinon of the International Searching Authority for Application No. PCT/IB2019/050908 dated May 28, 2019.

\* cited by examiner

AUTHENTICATING DIGITAL RECORDINGS

BACKGROUND

The present invention relates to digital recordings, and more specifically, to authenticating digital recordings using embedded encrypted data.

With the proliferation of mobile devices, any number of devices may record audio, images, and/or video at a given time. With modern editing techniques, the captured audio, images, and/or video may be manipulated to present an inaccurate depiction of events. For example, an audio recording of a speech may be spliced to order the speech in an inaccurate way, creating the impression that the speaker said something that was not actually stated.

SUMMARY

According to one embodiment, a method comprises extracting a first element of encrypted data embedded in a digital recording comprising at least one of audio data and image data captured in a recording environment, generating a first decrypted value, the generating performed by execution of a cryptography algorithm based on a private key and the first element of encrypted data, comparing the first decrypted value and a stored value associated with a first element of the digital recording, and authenticating the digital recording based on the first decrypted value substantially matching the stored value.

According to another embodiment, a computer program product comprises a non-transitory computer-readable storage medium having computer-readable program code embodied therewith, the computer-readable program code executable by one or more computer processors to perform an operation comprising extracting a first element of encrypted data embedded in a digital recording comprising at least one of audio data and image data captured in a recording environment, generating a first decrypted value, the generating performed by execution of a cryptography algorithm based on a private key and the first element of encrypted data, comparing the first decrypted value and a stored value associated with a first element of the digital recording, and authenticating the digital recording based on the first decrypted value substantially matching the stored value.

According to another embodiment, a system comprises a processor and a memory containing a program which when executed by the processor performs an operation comprising extracting a first element of encrypted data embedded in a digital recording comprising at least one of audio data and image data captured in a recording environment, generating a first decrypted value, the generating performed by execution of a cryptography algorithm based on a private key and the first element of encrypted data, comparing the first decrypted value and a stored value associated with a first element of the digital recording, and authenticating the digital recording based on the first decrypted value substantially matching the stored value.

DETAILED DESCRIPTION

Embodiments disclosed herein provide techniques to authenticate digital recordings. More specifically, embodiments disclosed herein configure security devices to emit encrypted data that is captured as part of the digital recording. The encrypted data may then be used to authenticate the digital recording, or a portion thereof. For example, the security device may emit a quick response code (QR Code®) that changes over time. The QR code may be generated based on a cryptographic function applied by a private key and one or more other parameters (e.g., location coordinates, the current date, the current time, etc.). The security device may be worn by a presenter, placed on a podium, or otherwise made visible to image and/or video recording devices. The recording devices may then record image and/or video data which includes the QR codes (e.g., a watermark). Subsequently, the recorded images and/or video may be provided to the entity holding the private key for authentication. Generally, the QR codes included in the recorded images and/or video may be decrypted using the private key. If each QR code is successfully authenticated, the entity holding the private key may authenticate the recording. Otherwise, the entity holding the private key may determine that the digital recording has been altered and return an indication that the digital recording is not authentic.

Figure 1:
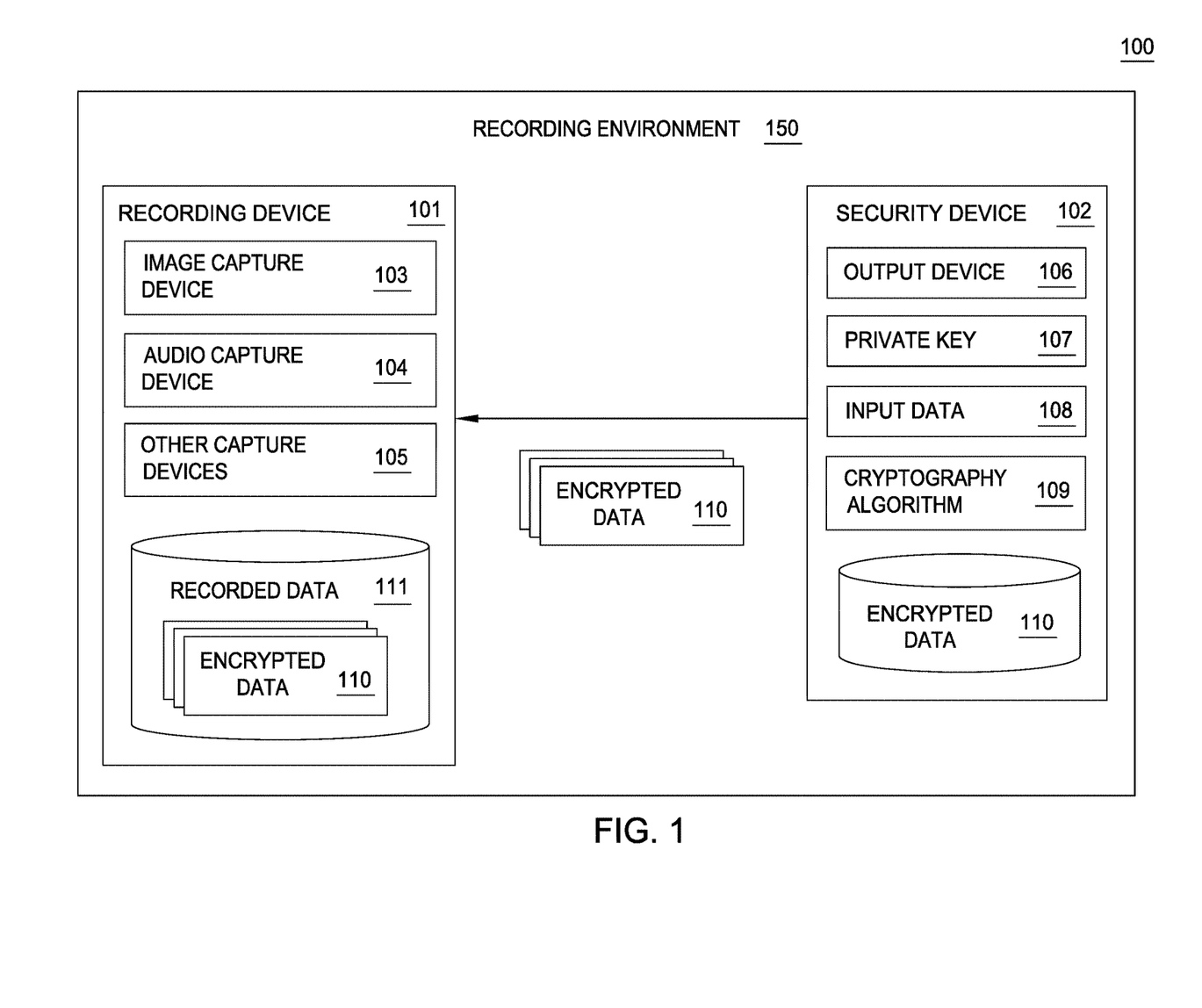
FIG. 1 illustrates an example system that authenticates digital recordings, according to one embodiment.

FIG. 1 illustrates an example system 100 that authenticates digital recordings, according to one embodiment. As shown, FIG. 1 depicts a recording environment 150 that includes one or more recording devices 101 and one or more security devices 102. The recording environment 150 may be any environment, including without limitation a public place, lecture hall, conference center, and the like. The recording devices 101 are representative of any device that can capture image and/or audio data to record digital audio, images, and/or video data. Example recording devices 101 include smartphones, digital video cameras, digital cameras, digital audio recorders, portable gaming devices, laptop computers, desktop computers, and the like. As shown, the recording devices 101 include an image capture device 103, an audio capture device 104, other capture devices 105, and a data store for recorded data 111. Although depicted as including more than one recording device, the recording device 101 may include only one, several or each of the image capture device 103, the audio capture device 104, the other capture devices 105. The image capture devices 103 include image sensors that generate image data, e.g., a camera. The audio capture devices 104 are representative of any device that can capture audio and store digital audio data, e.g., a microphone. The other capture devices 105 are representative of any other type of device that can record data emitted from the output device 106 of the security devices 102.

The security devices 102 are devices that may generate and output any type of data that can be captured by a recording device 101, including, without limitation, audible and/or inaudible audio data, image data, visible and/or invisible light data, and the like. As shown, the security devices include 102 include one or more output devices 106, a private key 107, an input data 108, a cryptography algorithm 109, and a data store of encrypted data 110. The output devices 106 are representative of any type of output device, such as display devices, speakers, e-ink devices, light emitting diodes (LEDs), infrared light emitters, and the like. The private key 107 is an alphanumeric string that is provided to the cryptography algorithm 109 with input data 108 to generate encrypted data 110 that is outputted via the output device 106. The cryptography algorithm 109 is representative of any symmetric encryption algorithm (also referred to as private key encryption) that generates encrypted data based on the private key 107 and the input data 108. Examples of cryptography algorithms 109 include, without limitation, the Advanced Encryption Standard (AES), Pretty Good Privacy (PGP), and the Triple Data Encryption Algorithm (TDEA). The cryptography algorithm 109 further decrypts the generated encrypted data using the private key 107. The encrypted data 110 may be, for example and without limitation, QR codes, barcodes, strings of alphanumeric characters, symbols, visible light patterns and/or colors, infrared light patterns. The input data 108 is representative of any type of data, such as global positioning system (GPS) coordinates of the location of the recording environment 150, the current date and/or time, a name of a current speaker and/or presenter in the recording environment, weather conditions near the recording environment 150 (e.g., temperature, wind speed, humidity, etc.), any other attribute of the recording environment 150, and the like. For example, based on the private key 107, the current date and time, and GPS coordinates of the recording environment 150, the cryptography algorithm 109 may generate a 128-bit string of alphanumeric characters as encrypted data 110. This string of encrypted data 110 may be outputted via the output devices 106, or may be converted to a different format (e.g., a QR code, audio data, LED light patterns, etc.) before being outputted via the output devices 106. The encrypted data 110 may further be stored with associated data (e.g., the input data 108) for future use.

The recording devices 101 may then capture image and/or audio data that includes the encrypted data 110 emitted by the output devices 106 of the security device 102. For example, an audio recording may include encrypted data 110 that is audio data outside of the range of human hearing, or infrared light data that is outside of the range of human vision. The captured data including the encrypted data 110 embedded as a watermark may then be stored in the recorded data 111. As the encrypted data 110 changes over time (e.g., every second, millisecond, etc.), the recorded data 111 includes a plurality of different instances of the encrypted data 110 for a given recording session (e.g., a speech, presentation, etc.).

Subsequently, the recorded data 111 including the encrypted data 110 may be authenticated. For example, a news corporation may transmit one or more segments of the recorded data 111 including the encrypted data 110 to an entity holding the private key 107 (e.g., a corporation, person, etc.). Each segment of the recorded data 111 may then be authenticated by decrypting the encrypted data 110 embedded in the recorded data 111 using the private key 107. For example, the encrypted data 110 of a frame of video may include the 128-bit alphanumeric sequence discussed above that was generated based on the then-current date and time and GPS coordinates of the recording environment 150.

The cryptography algorithm 109 may then decrypt the 128-bit alphanumeric sequence using the private key 107. If the output of the cryptography algorithm 109 indicates the encrypted data 110 is authentic (e.g., matches the GPS coordinates and the then-current date and time), that portion of recorded data 111 is authenticated. However, if the output of the cryptography algorithm 109 fails or otherwise indicates the encrypted data 110 is not authentic (e.g., does not match the GPS coordinates and/or the then-current date and time), that portion of recorded data 111 is determined to be inauthentic (e.g., because the image and/or audio data of the recorded data 111 was altered via an editing program).

As previously stated, in at least one embodiment, the encrypted data 110 is sequential. In such embodiments, the security device 102 may generate encrypted data 110 that matches a sequential pattern over time. As such, the sequential integrity of the encrypted data 110 may be enforced as part of the authentication process. For example, if two sequential frames of video data have encrypted data 110 that are not based on sequential timestamps, the recorded data 111 may be determined to be inauthentic (e.g., although the received two video frames are sequential in the received recorded data 111, the decryption of the encrypted data 110 embedded in each frame reflects that the second video frame is associated with a timestamp that is earlier in time than the first video frame). Doing so ensures that otherwise unaltered images or audio clips have not been rearranged.

Figure 2:
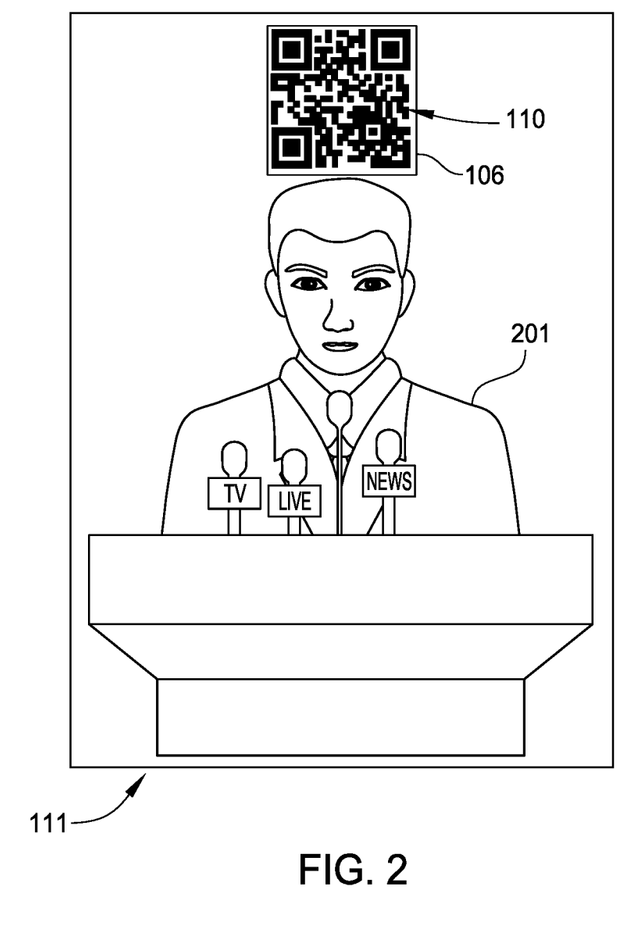
FIG. 2 illustrates an example image that includes embedded data used to authenticate digital recordings, according to one embodiment.

FIG. 2 illustrates an example image that includes embedded data used to authenticate digital recordings, according to one embodiment. As shown, the image of recorded data 111 depicts a person 201 and a QR code of encrypted data 110. The QR code 110 emitted by the output device 106 of a security device 102. As previously stated, the QR code 110 may be generated based on the private key 107 and the input data 108 (e.g., date, time, GPS coordinates, and any other type of data attribute) provided to the cryptography algorithm 109. To authenticate the image 111, the QR code 110 may be analyzed to determine the underlying data that forms the QR code 110 (since the QR code 110 is an optical representation of the underlying data). The underlying data may then be provided to the cryptography algorithm 109 that decrypts the underlying data of the QR code 110 using the private key 107. If the output of the cryptography algorithm 109 reflects that the QR code 110 is authentic (e.g., matches the input data 108), the image 111 is authenticated. Otherwise, the image 111 is determined to be inauthentic.

Although FIG. 2 depicts visible encrypted data 110, in other embodiments, the encrypted data 110 is not visible and/or audible by humans. For example, the encrypted data 110 may include audio tones that are not audible, image data that is not visible, and the like. Doing so allows the encrypted data 110 to be easily recorded by the recording devices 101, but not intrusive or distracting to viewers or listeners of the recorded data 111.

Figure 3:
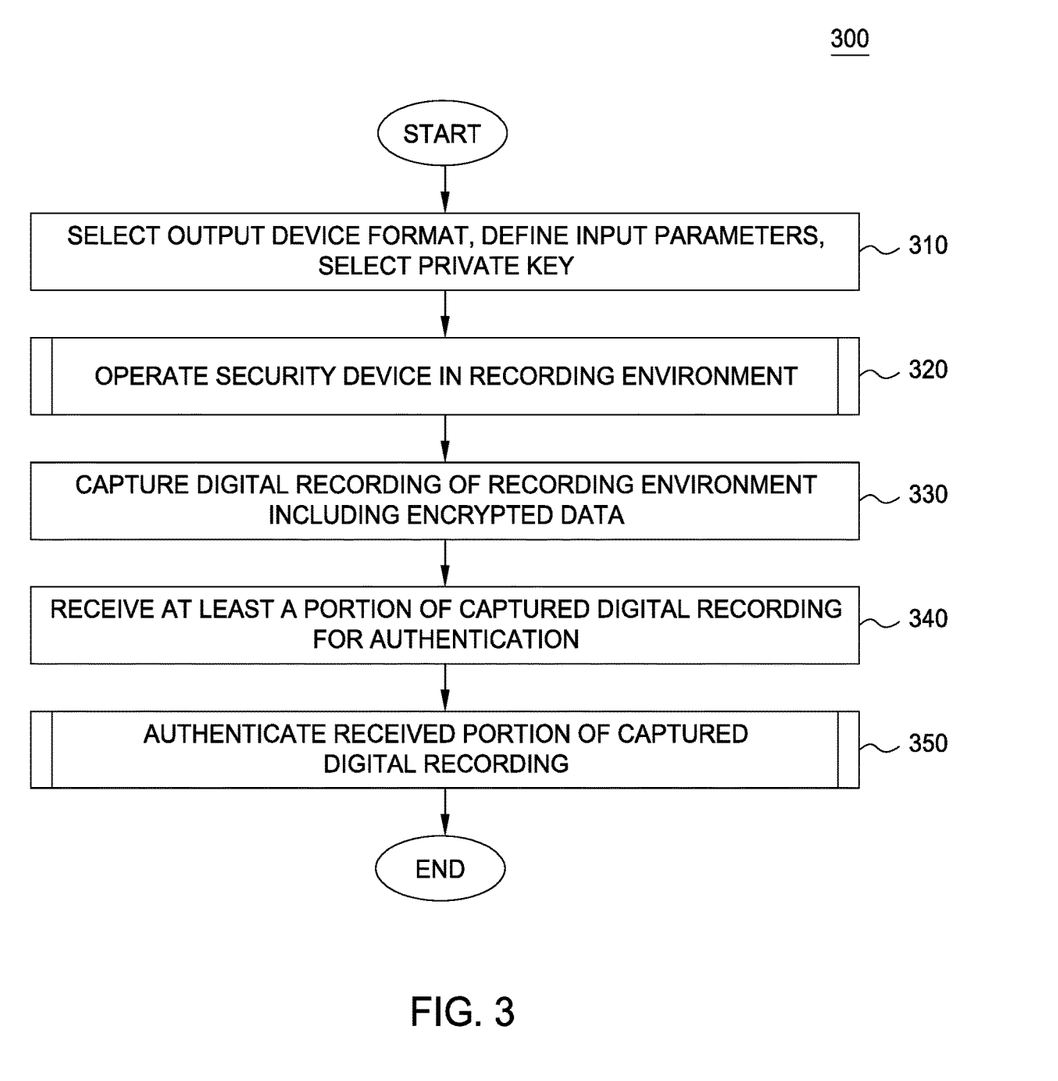
FIG. 3 is a flow chart illustrating a method to authenticate digital recordings, according to one embodiment.

FIG. 3 is a flow chart illustrating a method 300 to authenticate digital recordings, according to one embodiment. As shown, the method 300 begins at block 310, where the format of the output device(s) 106 of the security device 102 (e.g., audio, visual, etc.) and encrypted data 110 (e.g., QR code, alphanumeric string, audio tones, etc.) are selected for a recording environment 150. Additionally, one or more input parameters 108 (e.g., attributes such as GPS coordinates, date and/or time, weather conditions, etc.) and the private key 107 are selected. Furthermore, any other number and type of operating parameters for the security device 102 may be defined (e.g., time intervals for generating and/or outputting encrypted data 110, conversion functions to convert the output of the cryptographic algorithm 109 to a format supported by the output devices 106, etc.). At block 320, described in greater detail with reference to FIG. 4, the security device 102 operates in the recording environment 150, generating and outputting encrypted data 110 via the selected output devices 106.

At block 330, one or more recording devices 101 capture digital recordings of the recording environment 150 (e.g., capture an audio recording of a speech, capture a video of at least a portion of the recording environment 150, etc.), where the encrypted data 110 outputted by the security devices 102 is captured by the recording devices 101. As such, the encrypted data 110 is embedded in the recorded data 111 captured and stored by the recording devices 101. At block 340, at least a portion of the digital recording captured at block 330 is received for authentication by the entity holding the private key 107. At block 350, described in greater detail with reference to FIG. 5, the received portion of the captured digital recording is authenticated using the encrypted data 110 embedded therein. Generally, at block 350, each element of encrypted data 110 is decrypted using the encryption algorithm 108 and the private key 107. The resulting value is then compared to a stored value associated with the encrypted data 110 (e.g., the input data 108 that generated the encrypted data 110, such as a timestamp and/or GPS coordinate). If the decryption fails, or otherwise returns a value that does not match the associated stored value, the authentication fails. Similarly, if the sequence of encrypted data 110 indicates the order of the recording data 111 has been manipulated, the authentication fails. For example, if spoken statements are arranged from their original order to create a statement that was not actually spoken, the authentication fails, even though each statement may pass authentication in isolation. However, in some embodiments, the temporal nature of encrypted data 110 is considered for sequential blocks of recording data 111. For example, if the first thirty seconds and the last 30 seconds of an audio recording are received at block 340, the temporal nature of the encrypted data 110 is only considered vis-à-vis the first thirty second portion and the last thirty second portion, but not across the first and last thirty second portions.

Figure 4:
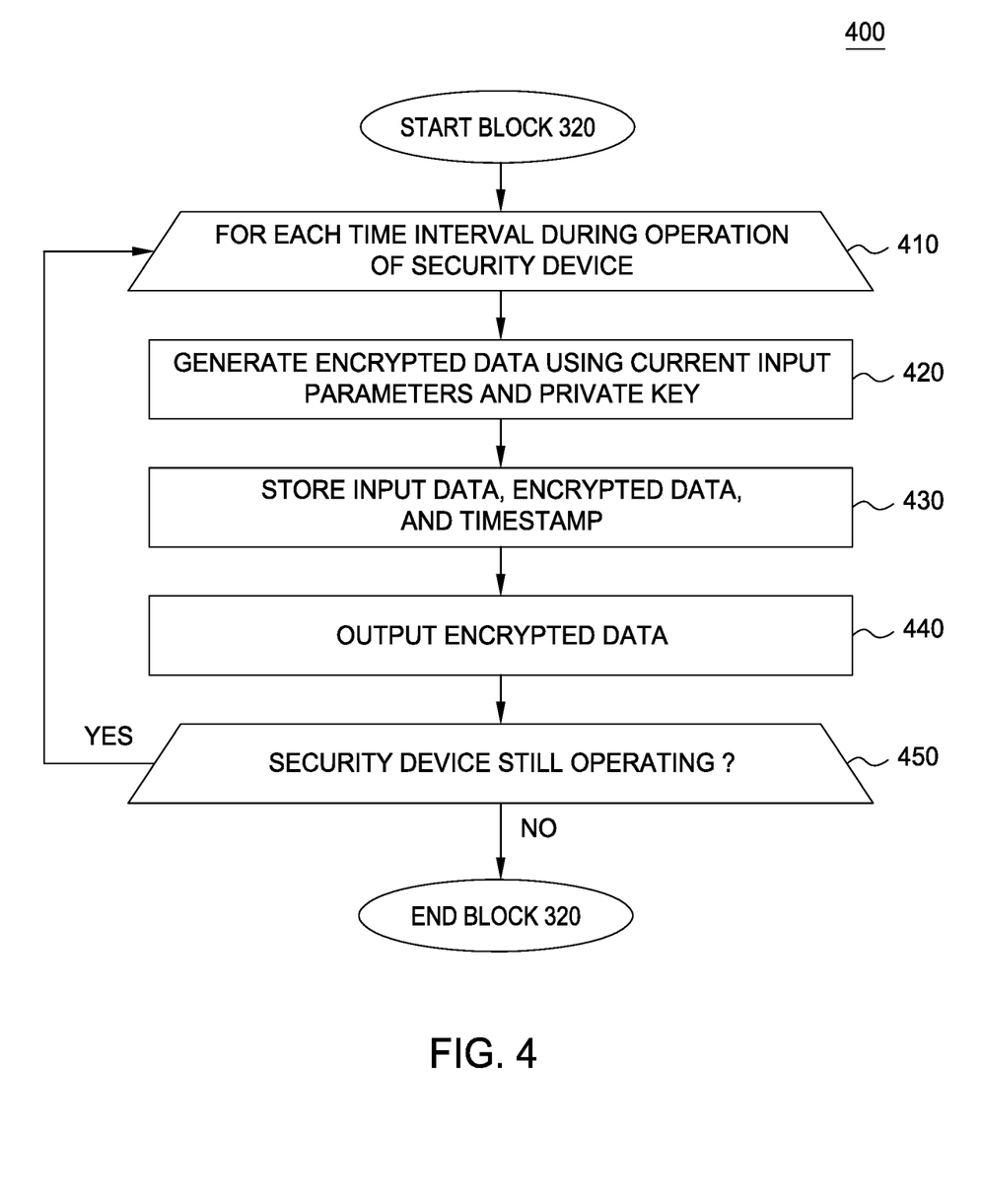
FIG. 4 is a flow chart illustrating a method to operate a security device in a recording environment, according to one embodiment.

FIG. 4 is a flow chart illustrating a method 400 corresponding to block 320 to operate a security device in a recording environment, according to one embodiment. As shown, the method 400 begins at block 410, the security device 102 executes a loop including blocks 420-450 for each of a plurality of time intervals during the operation of the security device. For example, the time interval may be a millisecond, half second, second, etc. At block 420, the cryptography algorithm 109 generates encrypted data 110 using the current input parameters and the private key 107. For example, the cryptography algorithm 109 may receive a timestamp from a clock for the current time interval, an indication of the name of a speaker, current weather data, and the GPS coordinates of the recording environment 150. The cryptography algorithm 109 may then generate the encrypted data 110 using the input data 108 and the private key 107. In at least one embodiment, the encrypted data 110 is converted to a different representation, e.g., from a n-bit sequence of alphanumeric characters to a QR code, audio tone, infrared light signal, etc.

At block 430, the input data 108, encrypted data 110, and the timestamp are stored as metadata in the data store of encrypted data 110. At block 440, one or more output devices 106 output the encrypted data generated at block 420. The recording devices 101 in the recording environment 150 may then capture a digital recording which includes the encrypted data 110 outputted by the output devices 106. At block 450, the security device 102 returns to block 410 if the security device 102 is still operating. Otherwise, the method 400 ends.

Figure 5:
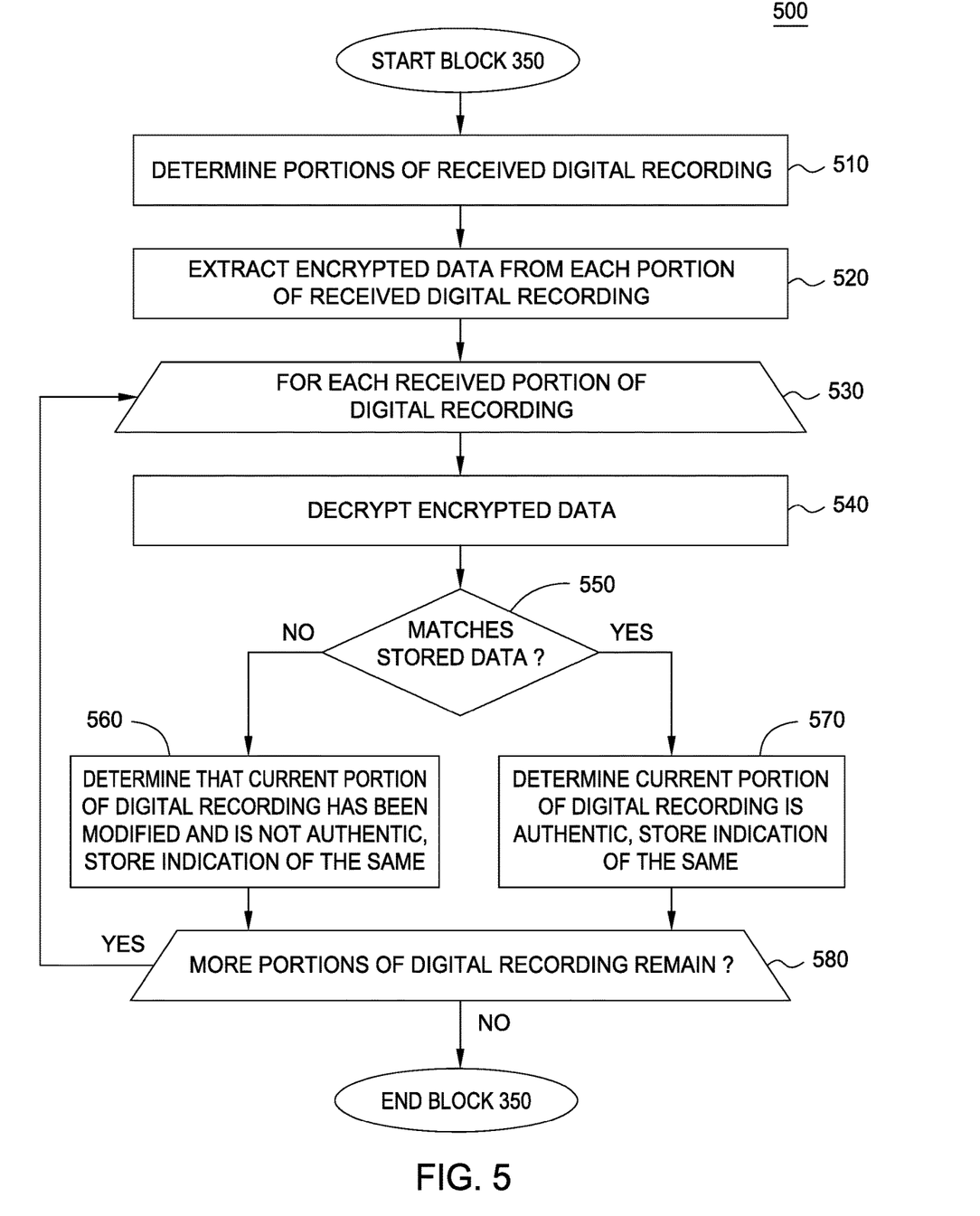
FIG. 5 is a flow chart illustrating a method to authenticate a received portion of a captured digital recording, according to one embodiment.

FIG. 5 is a flow chart illustrating a method 500 corresponding to block 350 to authenticate a received portion of a captured digital recording, according to one embodiment. Generally, any computing system having access to the public key 107, the encrypted data 110, and the associated input data 108 may execute the steps of the method 500. For the sake of simplicity, the steps of the method 500 will be discussed from the perspective of the security device 102. As shown, the method 500 begins at block 510, where the portions of the received digital recording are determined. Generally, the security device 102 may receive an indication of the relevant portions from the submitting entity (e.g., which portions of the audio and/or video clip are being submitted, the entire audio and/or video clip, etc.). At block 520, the security device 102 extracts the encrypted data 110 from each portion of the received recorded data 111 (e.g., each interval of audio and/or video data). At block 530, the security device 102 executes a loop including blocks 540-580 for each portion of the received recorded data 111. At block 540, the cryptography algorithm 109 decrypts the encrypted data 110 using the private key 107. At block 550, a comparison between the output of the decryption performed at block 540 and the stored data associated with the encrypted data 110 (e.g., the input data 108) is performed. For example, if the input data 108 is the current timestamp, weather data, and the GPS coordinates, the output of the cryptography algorithm 109 should include the timestamp, the weather data, and the GPS coordinates. If the output of the decryption performed at block 540 does not match the stored data, the method proceeds to block 560. In at least one embodiment, block 550 includes a determination as to whether the decrypted value, although matching an element of encrypted data 110, is out of sequence relative to a previous decrypted value. For example, if the current decrypted element of encrypted data 110 is not the next expected value of encrypted data 110, the authentication fails, e.g., because the sequence of audio and/or video has been edited inappropriately.

At block 560, the security device 102 determines that the current portion of the recorded data 111 has been modified and is not authentic, e.g., the authentication fails. Returning to block 550, if the output of the decryption performed at block 540 matches the stored input data 108, the method proceeds to block 570, where the security device 102 determines that the current portion of the recorded data 111 is authentic, and stores an indication of the same. At block 580, the security device 102 determines whether more portions of the recorded data 111 remain. If more portions remain, the method returns to block 510. Otherwise, the method 500 ends. Generally, if one or more portions of the recorded data 111 are not authenticated (e.g., the comparison at block 540 fails for any element of recorded data 111), the received portions of the digital recording are not authenticated. As previously stated, if one or more received portions are authenticated, but are not in the correct order, the recorded data 111 is not authenticated because the order (e.g., of statements, scenes, etc.) may have been modified.

Figure 6:
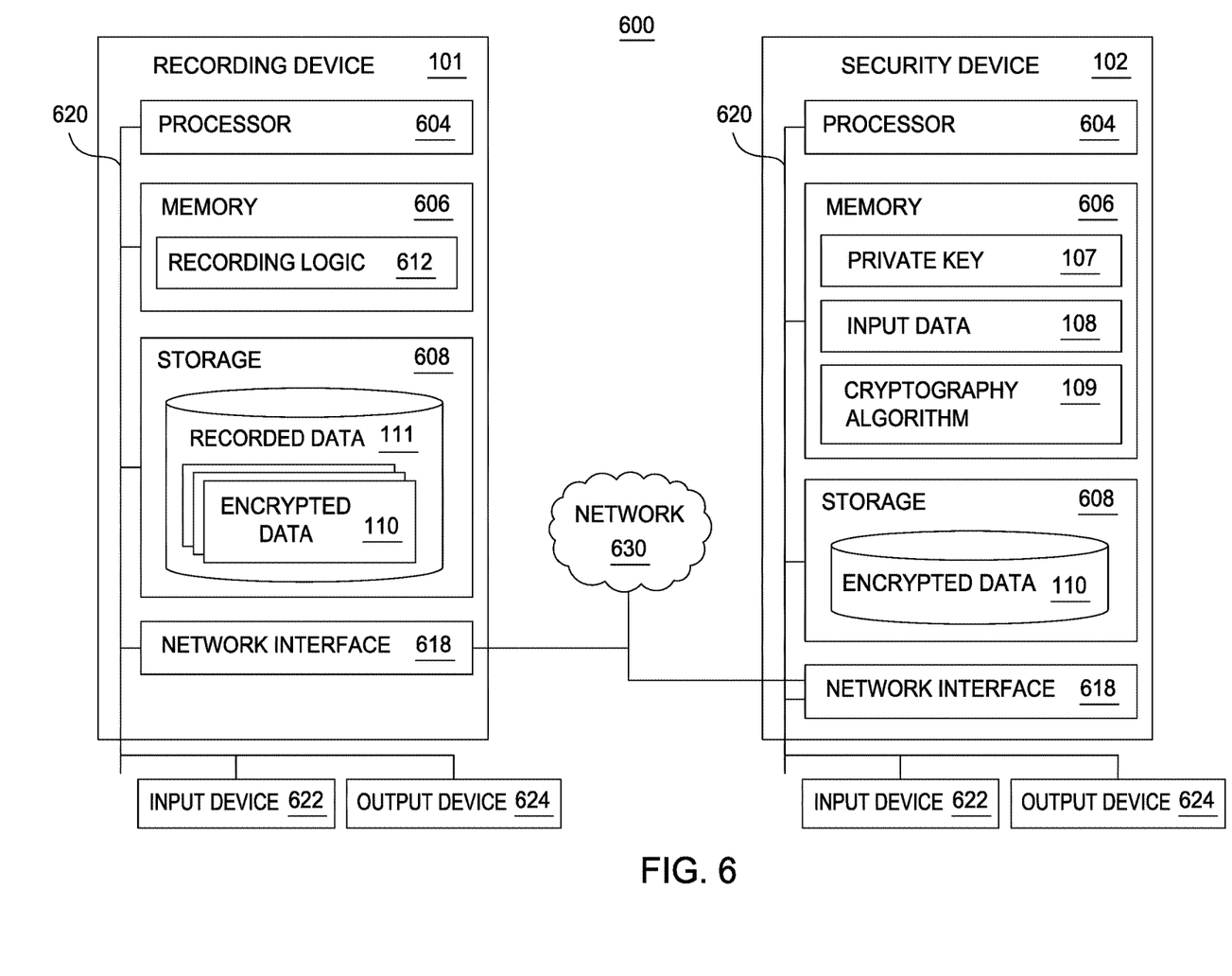
FIG. 6 illustrates a system that authenticates digital recordings, according to one embodiment.

FIG. 6 illustrates a system 600 that authenticates digital recordings, according to one embodiment. The networked system 600 includes a recording device 101 and a security device 102. The computing system 101 may also be connected to other computers via a network 630. In general, the network 630 may be a telecommunications network and/or a wide area network (WAN). In a particular embodiment, the network 630 is the Internet.

The recording device 101 and security device 102 generally include a processor 604 which obtains instructions and data via a bus 620 from a memory 606 and/or a storage 608. The recording device 101 and/or security device 102 may also include one or more network interface devices 618, input devices 622, and output devices 624 connected to the bus 620. The recording device 101 and/or security device 102 are generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 604 is a programmable logic device that performs instruction, logic, and mathematical processing, and may be representative of one or more CPUs. The network interface device 618 may be any type of network communications device allowing the recording device 101 and/or security device 102 to communicate with other computers via the network 630.

The storage 608 is representative of hard-disk drives, solid state drives, flash memory devices, optical media and the like. Generally, the storage 608 stores application programs and data for use by the recording device 101 and/or security device 102. In addition, the memory 606 and the storage 608 may be considered to include memory physically located elsewhere; for example, on another computer coupled to the recording device 101 via the bus 620.

The input device 622 may be any device for providing input to the recording device 101 and/or security device 102. For example, a keyboard and/or a mouse may be used. The input device 622 of the recording device 101 and/or security device 102 represent a wide variety of input devices, including keyboards, mice, controllers, and so on. Furthermore, the input device 622 may include a set of buttons, switches or other physical device mechanisms for controlling the computing system 101. The input device 622 of the recording device 101 further includes cameras, microphones, the image capture device 103, audio capture device 104, other capture devices 105, and the like.

The output device 624 may include output devices such as monitors, touch screen displays, and so on. The output device 624 of the security device 102 is further representative of the output device 106, e.g., LEDs, e-ink displays, speakers, infrared light emitters, and the like.

As shown, the memory 606 of the recording device includes recording logic 612, which is configured to generate digital representations of image data captured by the image capture device 103 and audio data captured by the audio capture device 104. The generated data includes the encrypted data 110 generated by the security device 102, and is stored in the storage 608 of the recording device 101. The memory 606 of the security device includes the private key 107, input data 108, and the cryptography algorithm 109, each described in greater detail above. The storage 608 of the security device 102 includes the encrypted data 110, described in greater detail above. Generally, the system 600 is configured to implement all systems, methods, and functionality described above with reference to FIGS. 1-5.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
generating, by a security device, a first element of encrypted data, wherein the first element of encrypted data is generated based on a private key and a first timestamp corresponding to a time in a recording environment;
outputting, by an output device of the security device, the first element of encrypted data in the recording environment;
receiving a digital recording comprising at least one of audio data and image data captured in the recording environment;
extracting the first element of encrypted data embedded in the digital recording;
generating a first decrypted value, the generating performed by execution of a cryptography algorithm based on the private key and the first element of encrypted data;
comparing the first decrypted value and a stored value associated with a first element of the digital recording; and
authenticating the digital recording based on the first decrypted value substantially matching the stored value.

2. The method of claim 1, further comprising
generating, by the security device comprising a processor executing the cryptography algorithm, a plurality of elements of encrypted data including the first element of encrypted data, wherein each element of encrypted data is generated based on the private key, a respective current timestamp, and one or more attributes, the one or more attributes comprising: (i) a set of global positioning system coordinates of the recording environment, (ii) a current temperature at the recording environment, (iii) a current humidity level at the recording environment, (iv) a current wind speed at the recording environment, and (v) a person speaking in the recording environment; and outputting, by the output device of the security device, each of the plurality of elements of encrypted data.

3. The method of claim 1, further comprising:

extracting a second element of encrypted data, embedded in the digital recording;

generating, by the cryptography algorithm based on the private key and the second element of encrypted data, a second decrypted value;

comparing the second decrypted value and a stored value associated with a second element of the digital recording; and determining, based on the second decrypted value not matching the stored value associated with the second element of the digital recording, that the second element of the digital recording is not authentic.

4. The method of claim 3, wherein the digital recording comprises the audio data and the image data, wherein the first element of encrypted data is embedded in a first one of the audio data and the image data of the digital recording, wherein the second element of encrypted data is embedded in a second one of the audio data and the image data of the digital recording.

5. The method of claim 4, wherein the first element of encrypted data comprises a first one of: (i) an alphanumeric string of characters, (ii) a quick response (QR) code, (iii) a light pattern out of range of human vision, (iv) a light pattern in range of human vision, (v) an audio tone out of range of human hearing, (vi) an audio tone in range of human hearing, and (vii) a symbol, wherein the second element of encrypted data comprises a second one of: (i) the alphanumeric string of characters, (ii) the quick response (QR) code, (iii) the light pattern out of range of human vision, (iv) the light pattern in rage of human vision, (v) the audio tone out of range of human hearing, (vi) the audio tone in range of human hearing, and (vii) the symbol.

6. The method of claim 1, further comprising:

prior to outputting the first element of encrypted data, converting the first element of encrypted data based on an output format of the output device.

7. The method of claim 1, further comprising:

extracting a second element of encrypted data embedded in the digital recording;

generating, by the cryptography algorithm based on the private key and the second element of encrypted data, a second decrypted value;

comparing the second decrypted value and a stored value associated with a second element of the digital recording;

determining, based on the comparison, that the second decrypted value matches the stored value associated with the second element of the digital recording;

determining that the first and second elements of the digital recording are sequential;

determining, that the first and second decrypted values are not sequential; and determining that the digital recording is not authentic.

8. A system, comprising:

a computer processor; and a memory containing a program which when executed by the processor performs an operation comprising:

generating, by a security device, a first element of encrypted data, wherein the first element of encrypted data is generated based on a private key and a first timestamp corresponding to a time in a recording environment;

outputting, by an output device of the security device, the first element encrypted data in the recording environment;

receiving a digital recording comprising at least one of audio data and image data captured in the recording environment;

extracting the first element of encrypted data embedded in the digital recording;

generating a first decrypted value, the generating performed by execution of a cryptography algorithm based on the private key and the first element of encrypted data;

comparing the first decrypted value and a stored value associated with a first element of the digital recording; and authenticating the digital recording based on the first decrypted value substantially matching the stored value.

9. The system of claim 8, the operation further comprising:

generating, by the security device comprising a processor executing the cryptography algorithm, a plurality of elements of encrypted data including the first element of encrypted data, wherein each element of encrypted data is generated based on the private key, a respective current timestamp, and one or more attributes, the one or more attributes comprising: (i) a set of global positioning system coordinates of the recording environment, (ii) a current temperature at the recording environment, (iii) a current humidity level at the recording environment, (iv) a current wind speed at the recording environment, and (v) a person speaking in the recording environment; and outputting, by the output device of the security device, each of the plurality of elements of encrypted data.

10. The system of claim 9, the operation further comprising:

prior to outputting the first element of encrypted data, converting the first element of encrypted data based on an output format of the output device.

11. The system of claim 8, the operation further comprising:

extracting a second element of encrypted data embedded in the digital recording;

generating, by the cryptography algorithm based on the private key and the second element of encrypted data, a second decrypted value;

comparing the second decrypted value and a stored value associated with a second element of the digital recording; and determining, based on the second decrypted value not matching the stored value associated with the second element of the digital recording, that the second element of the digital recording is not authentic.

12. The system of claim 11, wherein the digital recording comprises the audio data and the image data, wherein the first element of encrypted data is embedded in a first one of the audio data and the image data of the digital recording, wherein the second element of encrypted data is embedded in a second one of the audio data and the image data of the digital recording.

13. The system of claim 12, wherein the first element of encrypted data comprises a first one of: (i) an alphanumeric string of characters, (ii) a quick response (QR) code, (iii) a light pattern out of range of human vision, (iv) a light pattern in range of human vision, (v) an audio tone out of range of human hearing, (vi) an audio tone in range of human hearing, and (vii) a symbol, wherein the second element of encrypted data comprises a second one of: (i) the alphanumeric string of characters, (ii) the quick response (QR) code, (iii) the light pattern out of range of human vision, (iv) the light pattern in rage of human vision, (v) the audio tone out of range of human hearing, (vi) the audio tone in range of human hearing, and (vii) the symbol.

14. The system of claim 8, the operation further comprising:
    extracting a second element of encrypted data embedded in the digital recording;
    generating, by the cryptography algorithm based on the private key and the second element of encrypted data, a second decrypted value;
    comparing the second decrypted value and a stored value associated with a second element of the digital recording;
    determining, based on the comparison, that the second decrypted value matches the stored value associated with the second element of the digital recording;
    determining that the first and second elements of the digital recording are sequential;
    determining, that the first and second decrypted values are not sequential; and
    determining that the digital recording is not authentic.

15. A computer program product, comprising:
    a non-transitory computer-readable storage medium having computer-readable program code embodied therewith, the computer-readable program code executable by one or more computer processors to perform an operation comprising:
        generating, by a security device, a first element of encrypted data, wherein the first element of encrypted data is generated based on a private key and a first timestamp corresponding to a time in a recording environment;
        outputting, by an output device of the security device, the first element encrypted data in the recording environment;
        receiving a digital recording comprising at least one of audio data and image data captured in the recording environment;
        extracting the first element of encrypted data embedded in the digital recording;
        generating a first decrypted value, the generating performed by execution of a cryptography algorithm based on the private key and the first element of encrypted data;
        comparing the first decrypted value and a stored value associated with a first element of the digital recording; and
        authenticating the digital recording based on the first decrypted value substantially matching the stored value.

16. The computer program product of claim 15, the operation further comprising:
    generating, by the security device comprising a processor executing the cryptography algorithm, a plurality of elements of encrypted data including the first element of encrypted data, wherein each element of encrypted data is generated based on the private key, a respective current timestamp, and one or more attributes, the one or more attributes comprising: (i) a set of global positioning system coordinates of the recording environment, (ii) a current temperature at the recording environment, (iii) a current humidity level at the recording environment, (iv) a current wind speed at the recording environment, and (v) a person speaking in the recording environment; and
    outputting, by the output device of the security device, each of the plurality of elements of encrypted data.

17. The computer program product of claim 15, the operation further comprising:
    extracting a second element of encrypted data embedded in the digital recording;
    generating, by the cryptography algorithm based on the private key and the second element of encrypted data, a second decrypted value;
    comparing the second decrypted value and a stored value associated with a second element of the digital recording; and
    determining, based on the second decrypted value not matching the stored value associated with the second element of the digital recording, that the second element of the digital recording is not authentic.

18. The computer program product of claim 17, wherein the digital recording comprises the audio data and the image data, wherein the first element of encrypted data is embedded in a first one of the audio data and the image data of the digital recording, wherein the second element of encrypted data is embedded in a second one of the audio data and the image data of the digital recording.

19. The computer program product of claim 18, wherein the first element of encrypted data comprises a first one of: (i) an alphanumeric string of characters, (ii) a quick response (QR) code, (iii) a light pattern out of range of human vision, (iv) a light pattern in range of human vision, (v) an audio tone out of range of human hearing, (vi) an audio tone in range of human hearing, and (vii) a symbol, wherein the second element of encrypted data comprises a second one of: (i) the alphanumeric string of characters, (ii) the quick response (QR) code, (iii) the light pattern out of range of human vision, (iv) the light pattern in rage of human vision, (v) the audio tone out of range of human hearing, (vi) the audio tone in range of human hearing, and (vii) the symbol.

20. The computer program product of claim 15, the operation further comprising:
    extracting a second element of encrypted data embedded in the digital recording;
    generating, by the cryptography algorithm based on the private key and the second element of encrypted data, a second decrypted value;
    comparing the second decrypted value and a stored value associated with a second element of the digital recording;
    determining, based on the comparison, that the second decrypted value matches the stored value associated with the second element of the digital recording;
    determining that the first and second elements of the digital recording are sequential;
    determining, that the first and second decrypted values are not sequential; and
    determining that the digital recording is not authentic.

* * * * *